United States Patent
López et al.

(10) Patent No.: US 12,067,557 B2
(45) Date of Patent: Aug. 20, 2024

(54) COST MANAGEMENT IN DISTRIBUTED COMPUTING TEAMS

(71) Applicant: Advanced Micro Devices, Inc., Santa Clara, CA (US)

(72) Inventors: Juan José Galán López, Cáceres (ES); Cesar Gomez, Cáceres (ES)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/739,473

(22) Filed: May 9, 2022

(65) Prior Publication Data
US 2022/0358489 A1 Nov. 10, 2022

Related U.S. Application Data
(60) Provisional application No. 63/186,392, filed on May 10, 2021.

(51) Int. Cl.
*G06Q 20/36* (2012.01)
*G06Q 20/12* (2012.01)
*G06Q 20/32* (2012.01)
*G06Q 20/38* (2012.01)

(52) U.S. Cl.
CPC ........... *G06Q 20/367* (2013.01); *G06Q 20/12* (2013.01); *G06Q 20/326* (2020.05); *G06Q 20/384* (2020.05)

(58) Field of Classification Search
CPC .... G06Q 20/367; G06Q 20/326; G06Q 20/12; G06Q 20/384
See application file for complete search history.

(56) References Cited

U.S. PATENT DOCUMENTS

| | | | |
|---|---|---|---|
| 8,401,968 B1* | 3/2013 | Schattauer | G06Q 30/06 705/37 |
| 9,241,011 B2* | 1/2016 | Tandon | H04L 63/20 |
| 9,398,169 B2* | 7/2016 | Mohammed | H04M 15/66 |
| 9,799,162 B2* | 10/2017 | Fotevski | A63F 3/08 |
| 10,003,667 B2* | 6/2018 | Mathew | H04L 63/101 |
| 10,348,770 B2* | 7/2019 | Hoole | H04L 41/22 |
| 2013/0024364 A1* | 1/2013 | Shrivastava | G06Q 20/12 705/39 |
| 2013/0024371 A1* | 1/2013 | Hariramani | G06Q 20/384 705/41 |
| 2014/0019352 A1* | 1/2014 | Shrivastava | G06Q 20/326 705/41 |
| 2014/0337175 A1* | 11/2014 | Katzin | G06Q 20/326 705/26.62 |

FOREIGN PATENT DOCUMENTS

| | | | | |
|---|---|---|---|---|
| WO | WO-2013044175 A1 * | 3/2013 | | G06F 8/65 |
| WO | WO-2013049329 A1 * | 4/2013 | | G06F 8/65 |
| WO | WO-2013075071 A1 * | 5/2013 | | G06Q 20/12 |

* cited by examiner

*Primary Examiner* — Daniel S Felten
(74) *Attorney, Agent, or Firm* — Fishman Stewart PLLC

(57) ABSTRACT

A method for managing operational costs associated with distributed computing. The method includes: creating, via a graphical user interface (GUI), a distributed computing team; linking a digital team wallet to the distributed computing team, wherein the digital team wallet is linked to a currency account; adding a member to the distributed computing team; allowing the member to purchase compute resource access from a plurality of compute resource providers using the digital team wallet; and notifying a team manager when funds in the digital team wallet reduce to at least a team threshold value.

16 Claims, 5 Drawing Sheets

COST MANAGEMENT IN DISTRIBUTED COMPUTING TEAMS

CROSS-REFERENCE TO RELATED APPLICATION

This application claims the benefit of and priority to U.S. Provisional Patent Application Ser. No. 63/186,392, filed on May 10, 2021, the disclosure of which is hereby incorporated by reference in its entirety as though fully set forth herein

TECHNICAL FIELD

The disclosure relates generally to managing computing costs, and more specifically to costs associated with distributed computing teams.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Data intensive computing applications such as machine learning (ML), artificial intelligence (AI), data mining, and scientific simulation (often called workloads) frequently require large amounts of computing resources, including storage, memory, and computing power. As the time required for a single system or processor to complete many of these tasks would be too great, they are typically divided into many smaller tasks that are distributed to large numbers of computing devices or processors such as central processing units (CPUs) or specialized processors such as graphics processing units (GPUs), Tensor Processing Unit (TPUs) or field programmable gate arrays (FPGAs) within one or more computing devices (called nodes) that work in parallel to complete them more quickly. Specialized computing systems (often called clusters) have been built that offer large numbers of nodes that work in parallel. These systems have been designed to complete these tasks more quickly and efficiently. Clusters can have different topologies (i.e., how compute resources are interconnected within a node or over multiple nodes). Groups of these specialized computing systems are provided for access to users by many different cloud service providers.

Each cloud service provider has many different configurations (called instance types) that they offer at different prices. For example, a user may select between configurations having different numbers of CPUs, different generations or types of CPUs (e.g., x64, ARM, RISC-V) different amounts of memory, different amounts of storage, different types of storage (e.g., flash or disk), and different numbers and types of accelerators (e.g., GPUs, TPUs, FPGAs). While not every possible combination is typically available, there may be large numbers of different configurations available at each cloud provider. The price and availability of these instances change over time. For example, the most cost-effective way to secure use of these instances is to use "spot instances", meaning they are not reserved and are available on a first come first served basis. Their availability and pricing may change over time (e.g., based on supply and demand) as different users access them. A disadvantage of spot instances, however, is that cloud service providers may terminate the instance at any time (e.g., if the spot market price is below the user's bid price). This contrasts with a "reserved instance", which is effectively a leased instance reserved exclusively for a user for a predetermined amount of time (e.g., one month), or to an "on-demand instance" in which there is no commitment, but often comes at a premium price since a user may leave at any time.

As the number of cloud providers and instance types increases, it can be difficult for distributed computing teams (i.e., multi-member teams that employ such systems to reach project goals) to manage costs and minimize costs. For at least these reasons, there is a desire for an improved method and system for managing costs for distributed computing teams.

The foregoing discussion is intended only to illustrate examples of the present field and is not a disavowal of scope.

SUMMARY

Improved systems and methods for managing budgets in a distributed computing environment are presented herein.

According to an example, a method for managing operational costs associated with distributed computing includes: creating, via a graphical user interface (GUI), a first distributed computing team; linking a first digital wallet to the first distributed computing team, wherein the first digital wallet is linked to a first currency account; funding a first team budget via the first digital team wallet, wherein the first team budget is linked to the first distributed computing team; adding a first member to the first distributed computing team; funding a first member digital wallet via the first team budget; allowing the first member to purchase compute resource access from a plurality of compute resource providers using the first member digital wallet; and notifying a team manager when funds in the first team digital wallet reduce to at least a first member threshold value.

According to another example, a management server is configured to execute instructions that cause the management server to: create a first distributed computing team; link a first digital team wallet to the first distributed computing team, wherein the first digital team wallet is linked to a first currency account; fund a first team budget via the first digital team wallet, wherein the first team budget is linked to the first distributed computing team; add a first member to the first distributed computing team; fund a first member digital wallet via the first team budget; determine that the first member may purchase compute resources from a plurality of compute resource providers using the first member digital wallet; and set a first member threshold value, wherein a team manager is notified when funds in the first team digital wallet reduce to at least a first member threshold value.

And according to yet another example, a method includes: creating, via a management server, a first distributed computing team; linking a first digital team wallet to the team, wherein the first digital team wallet is linked to a first currency account; funding a first team budget via the first digital team wallet, wherein the first team budget is linked to the first distributed computing team; adding at least a first member and a second member to the first distributed computing team; funding, via the first team budget, a first digital member wallet linked to the first member and a second digital member wallet linked to the second team member; allowing the first member to purchase compute resource access using the first digital member wallet; allowing the second member to purchase compute resource access using the first digital member wallet notifying a team manager when funds in the first digital member wallet reduces to at least a first threshold value.

The examples above and others are described herein.

Further, examples described herein may be implemented in software (e.g., on a non-transitory, computer-readable storage medium storing instructions executable by a processor of a computational device that when executed cause the computational device to perform the method, and servers). The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
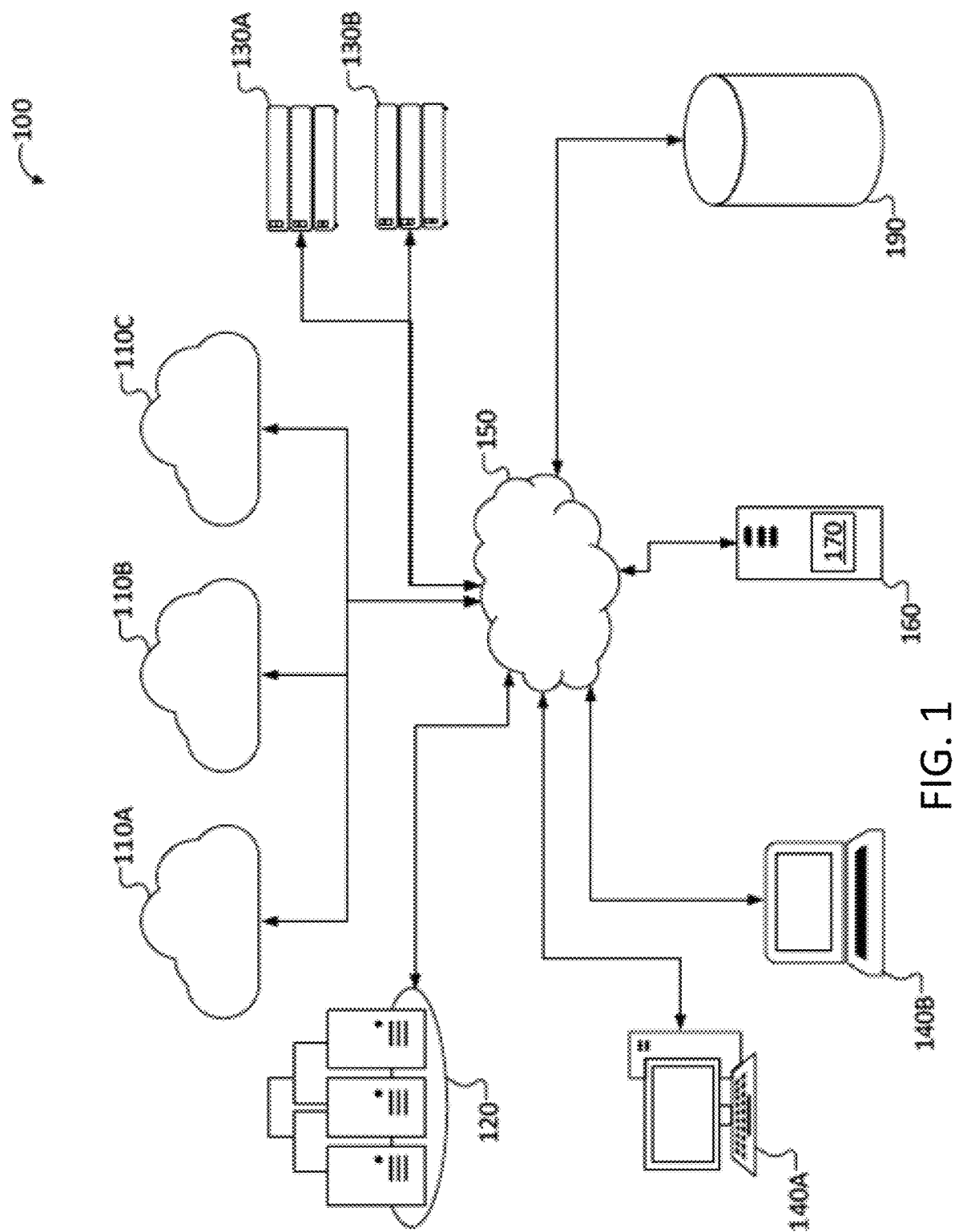
FIG. 1 is a schematic view generally illustrating an exemplary distributed computing system.

Turning now to FIG. 1, an exemplary system 100 for managing multi-cloud spot instance markets according to teachings of the presented. In this example, the system 100 is managed by a management server 160, which may for example provide users access to a spot instance market via a platform as a service (PAAS) or software as a service (SAAS). Users may for example access the PAAS/SAAS service from their on-premises network-connected PCs, servers, or workstations (140A) and laptop or mobile devices (140B) via a web interface.

Management server 160 is connected to a number of different computing devices and services via local or wide area network connections 150 such as the Internet. The computing services may include, for example, cloud computing providers 110A, 110B, and 110C. These cloud computing providers may provide access to large numbers of computing devices (often virtualized) with different configurations called instance types. For example, instance types with one or more virtual CPUs may be offered in different configurations with different amounts of accompanying memory, storage, accelerators, etc. In addition to cloud computing providers 110A, 110B, and 110C, in some embodiments, management server 160 may also be configured to communicate with bare metal computing devices 130A and 130B (e.g., non-virtualized servers), as well as a datacenter 120 including for example one or more supercomputers or high-performance computing (HPC) systems (e.g., each having multiple nodes organized into clusters, with each node having multiple processors and memory), and storage system 190. Bare metal computing devices 130A and 130B may for example include workstations or servers optimized for machine learning computations and may be configured with multiple CPUs and GPUs and large amounts of memory. Storage system 190 may include storage that is local to management server 160 and or remotely located storage accessible through network 150 and may include non-volatile memory (e.g., flash storage), hard disks, and even tape storage.

A system such as the management server 160 may be a traditional PC or server, a specialized appliance, one or more nodes within a cluster (e.g., running within a virtual machine or container). Management server 160 may be configured with one or more processors (physical or virtual), volatile memory, and non-volatile memory such as flash storage or internal or external hard disk (e.g., network attached storage accessible to management server 160).

Management server 160 may be configured to run a multi-cloud spot instance market management application 170 that receives jobs and manages the allocation of resources from distributed computing system 100 to run them. In one embodiment, the jobs may be configured to run within containers (e.g., Kubernetes with Docker containers, or Singularity) or virtualized machines. Kubernetes is an open-source system for automating deployment, scaling, and management of containerized applications. Singularity is a container platform popular for high performance workloads such as artificial intelligence and machine learning. Management application 170 is preferably implemented in software (e.g., instructions stored on a non-volatile storage medium such as a hard disk, flash drive, or DVD-ROM and executable by a processor of a computational device such as management server 160), but hardware implementations are possible. Software implementations of management application 170 may be written in one or more programming languages or combinations thereof, including low-level or high-level languages (e.g., Python, Rust, C++, C#, Java, JavaScript, or combinations thereof). The program code may execute entirely on the management server 160, partly on management server 160 and partly on other computing devices such as a user's network-connected PCs, servers, or workstations (140A) and laptop or mobile devices (140B).

The management application 170 may be configured to provide an interface to users (e.g., via a web application, portal, API server or command line interface) that permits users and administrators to submit application workloads (also called jobs) via their network-connected PCs, servers, or workstations (140A), or laptop or mobile devices (140B). The management application 170 may present the user with controls to specify the application, the type of application (e.g., TensorFlow, scikit-learn, Caffe, etc.), the data sources to be used by the application, designate a destination for the results of the application, and selected application requirements (e.g., parameters such as a minimum number of processors to use, a minimum amount of memory to use, a minimum number of accelerators such as GPUs or TPUs or FPGAs, a minimum interconnection speed or type, cost limits, time limit for job completion, etc.). The management application may then select and search multiple clouds (e.g., clouds 110A-B) that offer spot instance types meeting the requirements. The management application may access the selected cloud systems, determine spot instance availability and pricing, and assemble a list of available instance types by stepping through different instance types (e.g., 2 CPUs, 4 CPUs, 6 CPUs, etc.) for each selected cloud service. The resulting list may for example be filtered to offer the best matches to the user from the available instance types. The management application 170 may present this to the user and permit them to select one to be used to run the application. The management application 170 may then deploy the application workload to the selected cloud instance type, provide progress monitoring for the application, and once the job has completed provide the results to the user, and decommission/destroy the instance.

Figure 2:
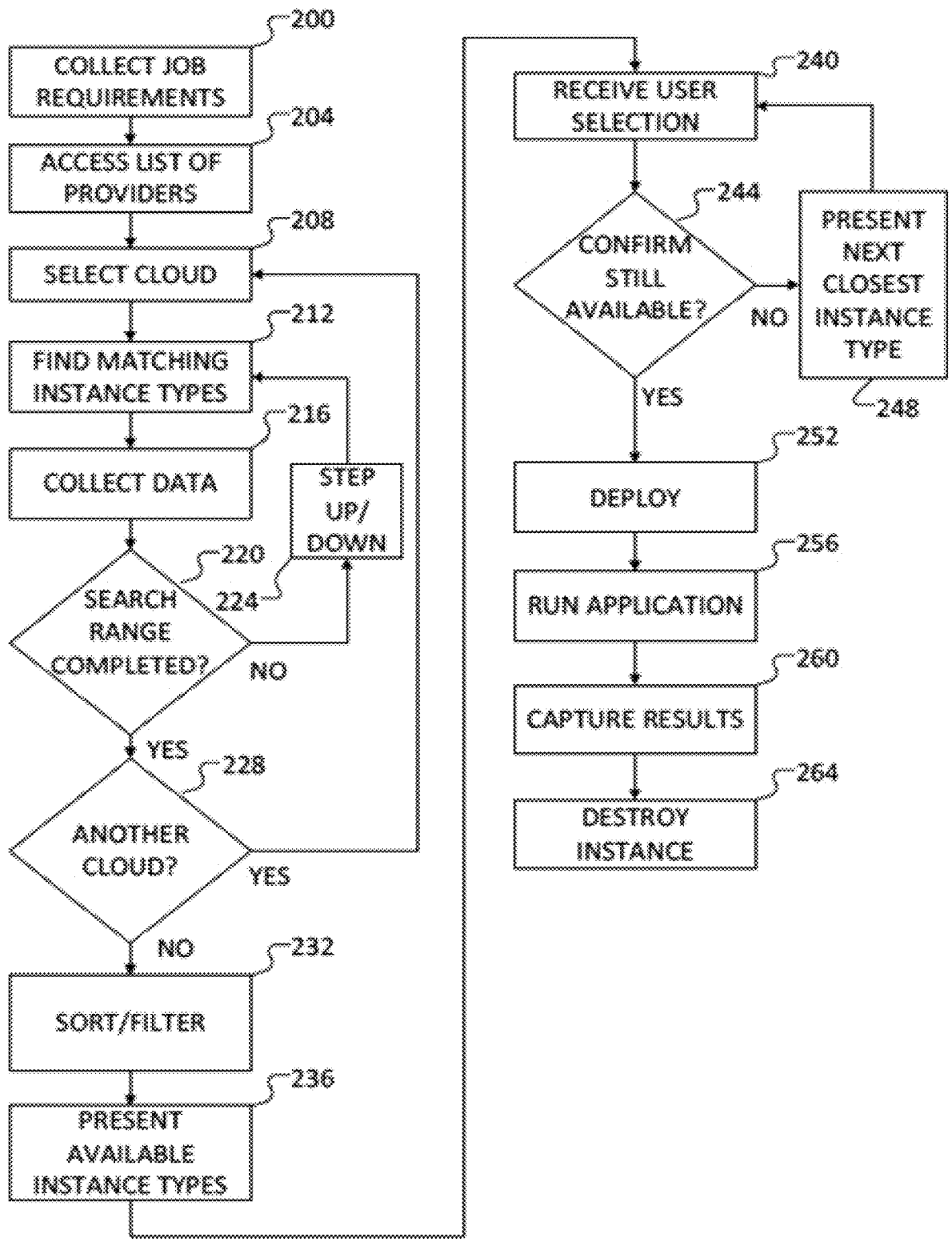
FIG. 2 is a flow diagram generally illustrating an example of an improved method for managing a multi-cloud spot instance market.

Turning now to FIG. 2, a flow diagram generally illustrating an exemplary method for managing a multi-cloud spot instance market according to teachings is shown. In this embodiment, job requirements are collected (step 200). For example, a minimum number of CPUs, a minimum number of GPUs, maximum execution time, minimum storage, data file size, geographic restrictions, and or minimum interconnection type/speed may be collected. These may for example be collected from a job metadata file, from previously stored job history (in the event the job is a repeat job or similar to a previous job), or interactively by prompting the user (e.g., via a web interface).

A list of registered cloud providers may be accessed (step 204), and a cloud provider may be selected (step 208). For example, system administrators may configure the system with a list of available cloud providers and associated metadata, such as which countries/regions they operate in, which types of instance types they offer, etc. In some embodiments, the list may not be limited to public cloud providers. In addition to public cloud providers, supercomputer centers or other non-traditional providers of computing resources may also be included as a cloud provider (e.g., if the owner of the supercomputer has registered their system to participate in the spot market). While they may not have the plethora of different instance types available that traditional large public cloud providers offer, they may nevertheless be able to participate with as few as a single available instance type.

The selected cloud provider may be queried for the availability of one or more instance types that meet the current job's requirements (step 212) and associated data may be collected (step 216). For example, the configuration, price and number of instances available of a particular instance type may be collected. Based on the job requirements and or instance types offered by the selected cloud provider, a range may be used for each cloud provider. For example, if a job requirement is at least 2 CPUs and at least 2 GPUs, and a particular cloud provider offers various combinations of CPUs and GPUs from 1:1 up to 8:16, then the search range may be from 2:2 to 8:16. If collecting data for the search range has not been completed, the query may be stepped up or down (step 224) for additional matching instance types, and the cloud may again be queried for the availability of one or more instance types that meet the current job's requirements (step 212), associated data may be collected (216), and the process may be repeated until the search range has been completed (step 220). Another cloud provider may be selected (step 228), and the process may be repeated. While the flowchart in the figure may be interpreted to depict a serial process, queries to multiple cloud provides may be submitted in parallel to speed up the process.

The list of available instance types may be filtered and or sorted (step 232) and presented to the user (step 236). For example, in one example if a large number of instance types are available, they may be sorted and presented to the user from lowest cost to highest cost. In another example, they may be filtered to provide a lowest cost option, a highest performance option, and a best bargain option (e.g., largest price discount relative to a reserved or on-demand instance). Different instance types may be sorted, for example, based on relative performance. The users may be presented with controls to select what type of filtering or sorting they prefer.

The user's selection from the available options maybe received (step 240), and the availability of that option may be confirmed (step 244). For example, an available instance may become unavailable during the delay between the system initially receiving the availability information and the user making their selection. In some embodiments this confirmation may only be performed if longer that a predetermined delay has occurred. If the selected instance type is no longer available, the next closest instance type may be presented to the user for confirmation (step 248). In other embodiments, the next closest instance type may be automatically selected and used without addition user intervention (e.g., if there is no difference in price or performance).

The job may then be deployed to the selected instance type (step 252). This may entail creating an instance on the selected cloud provider's system of the selected instance type and loading the application workload onto the instance once it has been created. For example, Docker or Singularity container(s) with the application may be automatically loaded onto the instance once it is created. Network ports/connections (e.g., SSH, VPN) may be configured, node interconnections may be configured, data sources may be transferred (or connected to), performance monitoring tools (e.g., perf) may be loaded and configured, and a destination for results may be configured.

The application may be run (step 256), and the results may be captured (step 260). This may for example include collecting performance data (e.g., from the perf tool) as well as the results from the application's run. Once the job is completed and the results have been captured, the instance(s) may be deleted/destroyed/terminated (step 264). As many cloud providers charge based on time (e.g., per minute), it may be advantageous to destroy the instance as soon as possible.

In some embodiments, the availability information may be stored with a timestamp, and if the user submits (or resubmits) an application within a predetermined time period (e.g., 10 minutes), the stored historical availability data may be used in lieu of performing the search.

Figure 3:
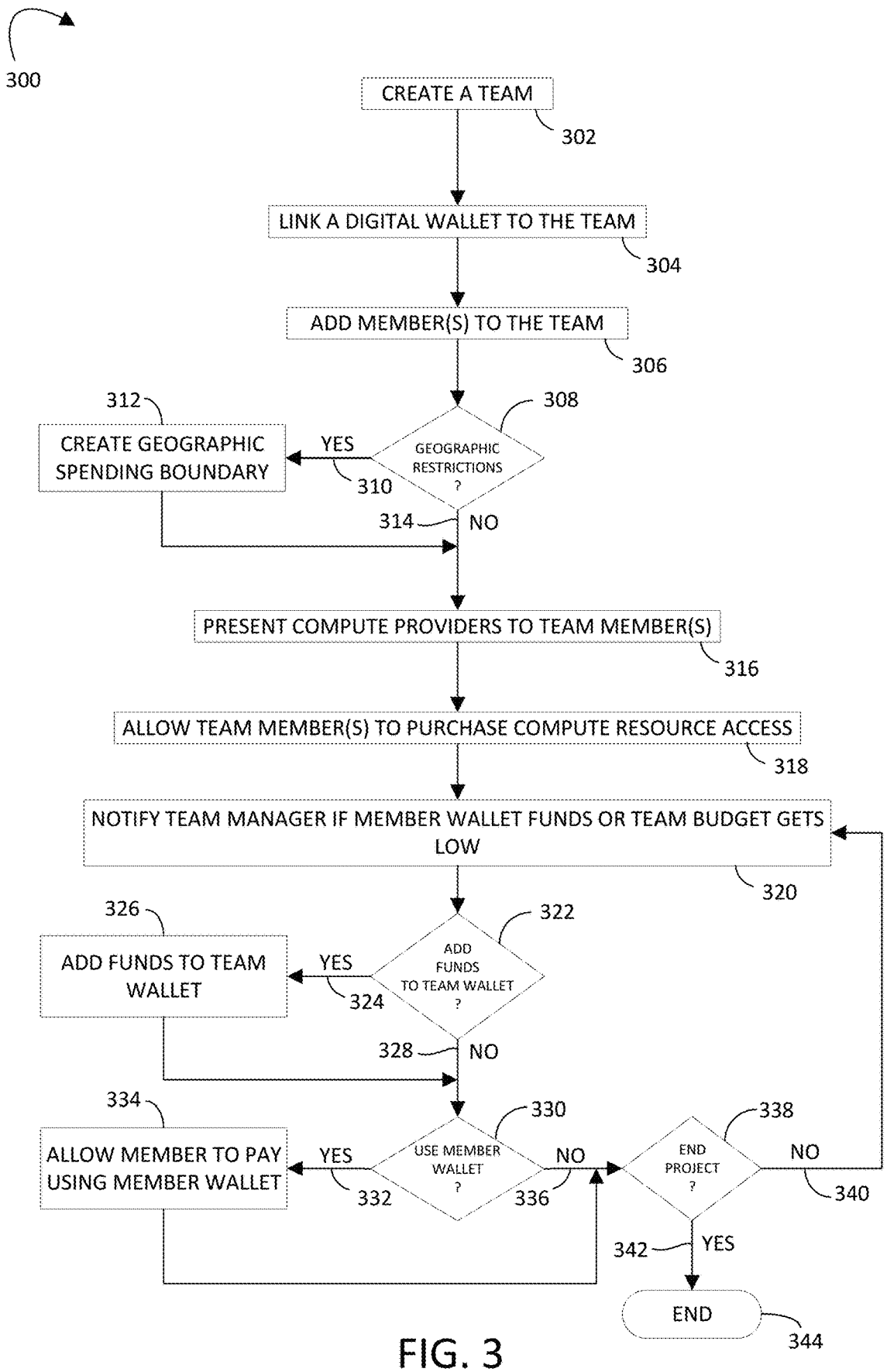
FIG. 3 illustrates an exemplary technique managing operating funds employed in a distributed computing system.

Turning now to FIG. 3, a technique 300 for managing operating funds employed in a distributed computing system is shown. The technique 300 may, for example, be carried out by a management server (see, e.g., the server 160 of FIG. 1).

Technique 300 begins at block 302, where a team is created via a graphical user interface (GUI). Proceeding to block 304, a digital wallet is linked to the team created at block 302. The digital team wallet may be further linked to a variety of different currency accounts. For example, the digital wallet may be linked to a cryptocurrency account such as Bitcoin or the like. Alternatively, the wallet may be linked to a currency account backed by some type of government (e.g., dollars, kroners, euros, and the like).

At block 306, team member(s) may be added to the team created at block 302. After one or more team members are added, a determination may be made at block 308 as to whether any team members have geographic restrictions with regard to purchasing access to and/or using compute resources. Some countries may punish its residents or citizens from using, or purchasing access to, compute resources residing in one or more geographic areas. For example, some countries only allow their residents and/or citizens to use cloud computing clusters located in government-accepted geographic areas. As such, at block 308 process control determines which, if any, members are subject to such restrictions or prohibitions. This may, for example, be carried out electronically and automatically.

If a member is subject to geographic restrictions 310, process control creates geographic spending boundaries at block 312. This too may, for example be done electronically and automatically. For example, IP address or other geographic identifiers could be employed for this purpose.

As will be discussed later, the geographic boundaries minimize the risk that a team member will engage in computing with a system in a restricted geographic boundary.

If, the member(s) are not subject to geographic restriction 314 (or after the boundaries are set), process control proceeds to block 316, where team members are presented a variety of compute providers (e.g., cloud providers or other computer clusters). If a member is subject to geographic restrictions 310, that member may only be presented compute providers that reside in the already created spending boundaries 312. To put another way, members may be prohibited from employing compute providers in certain geographic locations.

Alternatively, instead of hiding access to certain providers, the one or more members may be able to view the restricted providers, but will be unable to purchase from the restricted providers due to restrictions on the digital team wallet.

Regardless of how the purchasing restrictions or prohibitions are carried out, members may be protected from inadvertently purchasing access to computer resources in restricted locations. Accordingly, the technique may offer protections to its members.

With continued reference to FIG. 3, if a member is not subject to geographic restrictions 314, that member will likely be presented a greater variety of compute providers. Accordingly, every member of the team may not be presented the same amount of compute providers.

Once relevant compute providers are presented to team members, the team member(s) are allowed to purchase access to compute resources from one or more of the compute providers they have access to using the digital team wallet. As team members purchase compute resource access, funds in the digital team wallet will begin to deplete. Accordingly, at block 320 process control notifies the team manager or other user if funds in the digital team wallet get low. For example, the team manager or other user may be notified if funds fall to or below 10% of its original value. Alternatively, another type of team threshold value could be employed. Still further, other rubrics or percentages could instead be employed to determine if funds in the digital team wallet are considered low.

While not shown, according to other examples, team members may set up their notifications so they too are notified when funds get low.

Regardless of the manner in which the low funding determination is made, at block 322 of FIG. 3, a determination is made as to whether additional funds will be added to the digital team wallet. This determination may be made by, for example, the team manager or other user. Alternatively, a smart contract or the like may be employed to automatically make the determination. As such, when funds in the digital team wallet reduce to, or below, a threshold value, the wallet may be funded automatically or manually.

Nonetheless, if it is determined that funds will be added 324 to the digital team wallet, process control proceeds to block 326 and funds are added to the digital team wallet. A team manager or other user may decide how much to add to the digital team wallet or, alternatively, a smart contract or other rubric could automatically (i.e., without human intervention) determine how much money will be added the digital team wallet.

On the other hand, if the determination is made at block 322 that no money will be added 328 to the digital team wallet, process control proceeds to block 330. At block 330 a determination is made as to whether funds from a team member's digital wallet can be used to purchase access to the compute resources. Such a feature may be valuable if a member is unable to contact a super user or manager when funds are urgently needed and funds in the digital team wallet are low.

If a team member is allowed to purchase 332 to purchase access to compute resources using a personal digital wallet (e.g., a digital member wallet), process control proceeds to block 334 and the member is allowed to purchase compute access using their digital member wallet. Alternatively, if a member is not allowed to purchase 336 compute access using their digital wallet, process control proceeds to block 338 and a determination is made whether to end the project. The determination may be made by the manager or by some other user. Alternatively, a smart contract or the like could dictate whether the project ends.

If the project does not end 340, process control proceeds back to block 320 and a team manager is notified if funds in the digital team gets low as technique 300 continues. On the other hand, if it is determined that the project will end 342, process control proceeds to and END at 344.

While the technique 300 of FIG. 3 represents an order of blocks, other examples may rearrange the order. Further, while examples discussed above set forth a team manager making determinations and decisions (e.g., add funds to team wallet), other examples may have other users (e.g., one or more team members) making one or more of the decisions and determination discussed above. It is contemplated, however, that here may be a hierarchy of users. For example, a "super user" may be allowed to make any decision or determination discussed above. Next, a team manager or the like may be only allowed to add funds to a digital team wallet and view team and member budgets. Further, while team members may not be allowed to add funds to a digital team wallet, team members may only be allowed to view their own budget or determine how much funds are in the digital team wallet. These are, however, only a few examples of privileges. A system administrator or other user may implement any type of privilege structure he or she would like. Alternatively, smart contracts could be employed to dictate privileges of each role.

Figure 4B:
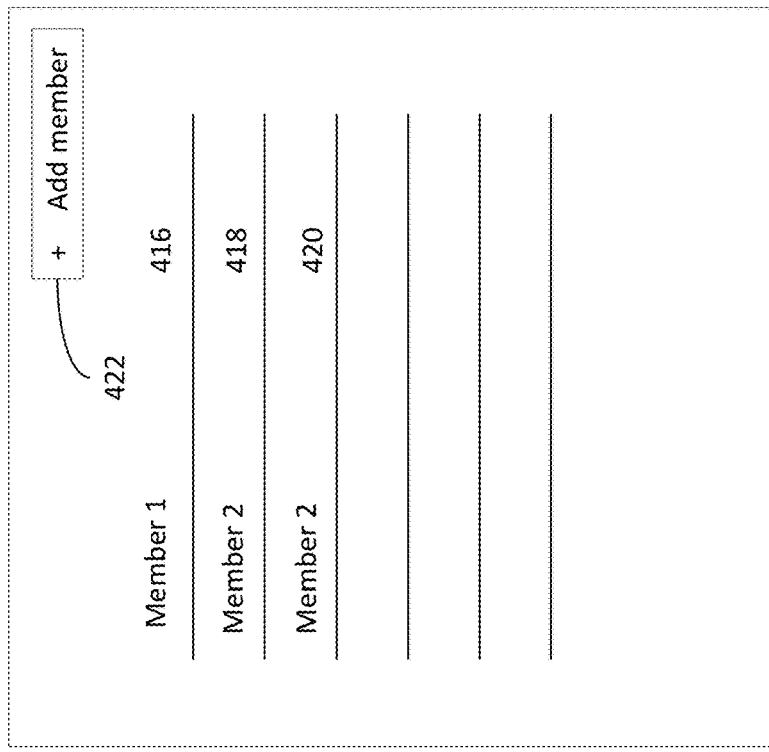
FIGS. 4A-4C illustrate exemplary graphical user interfaces that may be employed in examples described herein.
Figure 4B:
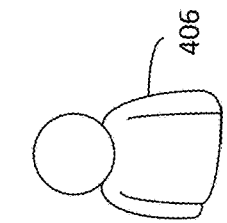
Figure 4A:
Figure 4A:
Figure 4C:
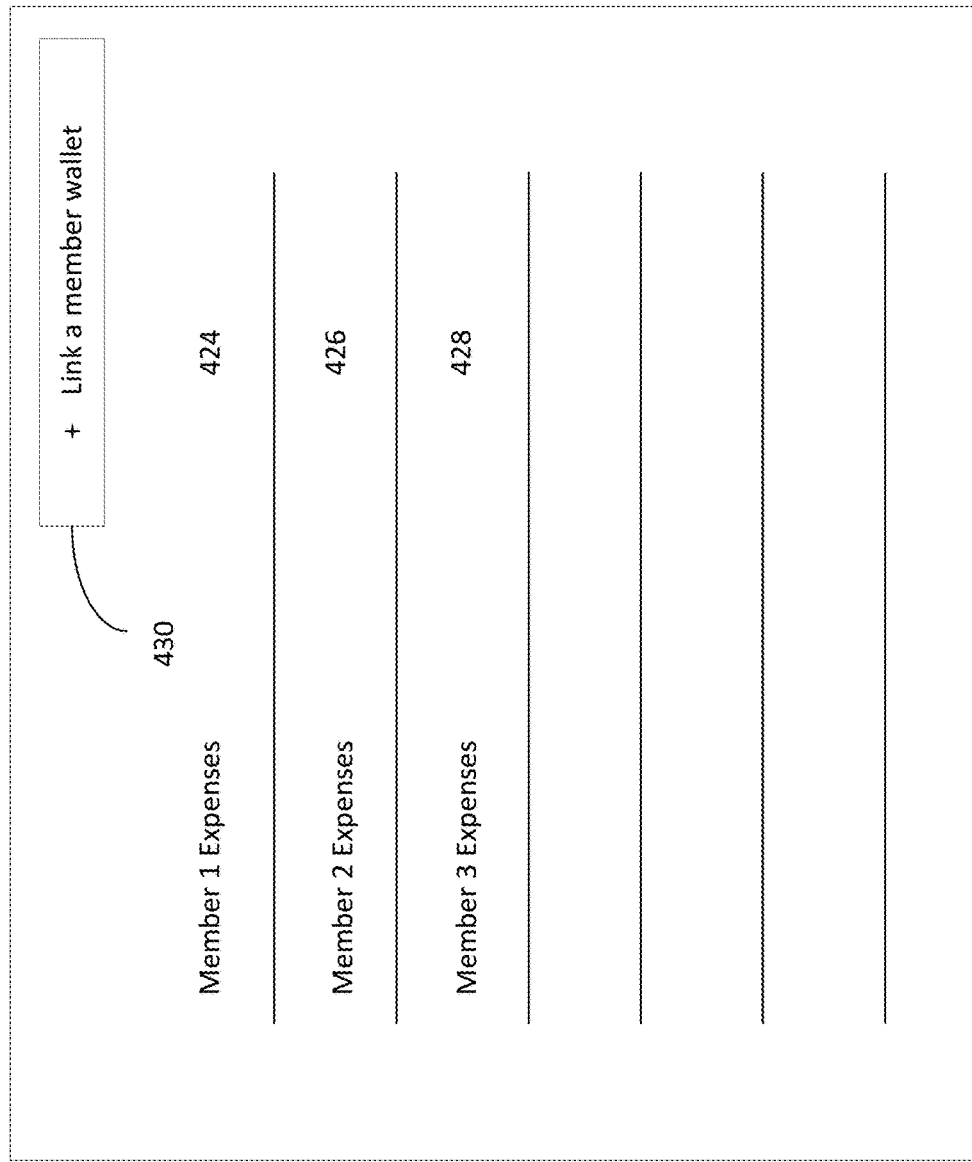

With reference now to FIGS. 4A-4C a plurality of graphical user interfaces 400, 402, 404 are shown. The GUIs 400-404 are merely exemplary and features and fields described below could instead take on different arrangements (e.g., different combinations of the one or more GUIs 400-404 and/or different combinations of different fields and features) than those shown, but still represent the techniques and systems described herein.

With reference now to the first exemplary GUI 400 of FIG. 4A, an interface where a user 406, such as a team manager, can view and edit a team name field 408, a team description field 410, a team budget field 412, and a team remaining budget field 414 is shown.

As mentioned, a user can may be allowed to edit each field 408-414. For example, the user 406 may be able to add funds from a digital team wallet to the budget if needed or desired.

The second exemplary GUI 402 of FIG. 4B illustrates an interface where the user 406 can add team members such as a first team member 416, a second team member 418, and a third team member 420 to the previously created team 408. To add the team members 416-420, the user 406 may employ an add team member feature 422. While three members 416-420 are illustrated in the second GUI 402, any given team may have more or less team members. Further, according to other examples, the user 406 may be given the opportunity to remove team members. For example, the user 406 may remove one or more of the first, second, and third team members 416-420. As such, team size may fluctuate over time.

The third exemplary GUI 404 of FIG. 4C represents a user interface where the user 406 may view team member expenses 424, 426, 428. That is, the user 406 can view how much each user has spent (424-428) on the project the team is associated.

As described above, at least with respect to in FIGS. 2 and 3, costs may be incurred when users employ compute systems. For example, costs are accrued any time a user purchases access to compute resources provided by a compute system (e.g., cloud providers). Further, since a user may access a plurality of different compute providers, it can be difficult to monitor costs.

Systems and techniques described herein, however, provide an efficient manner to keep track of spending and budgets. For example, the third exemplary GUI 404 of FIG. 4C gives a user (e.g., user 406) an opportunity to see each team member's expenses in real-time.

If desired, an exemplary link a member wallet feature 430 may be employed so that a team member may use their own personal digital wallet to pay for access to compute resources. Such a feature may be valuable if a member is unable to contact a super user or manager when funds are urgently needed.

In view of the GUIs 400-404 discussed above, the user 406 is given the opportunity to control and monitor the team budget and each member's expenses in real-time. It is contemplated, however, that not every user will have privileges to control budgets or even view expenses. For example, the user 406 of FIGS. 4A-4C may be given control of certain features only if the user 406 is deemed a team manager or other type of super user. As such, while team members 416-420 may be allowed to view their own or other expenses 424-424 in real-time, they 416-420 may not be allowed to increase the team budget 412.

The techniques and systems described herein provide many benefits for distributed computing teams. As discussed above, the techniques and systems described herein may allow for real-time monitoring of budgets. Further, graphs and other visualizations can be generated for one or more users so that spending can be tracked.

Further, as discussed above at least with respect to FIGS. 3 and 4A-4C, privileges can be ascribed or associated with certain users. For example, a team manager may be allowed to create multiple teams, with each team having its own member(s). Using techniques and systems described herein, the manger may allocate funds to each team budget. In turn, the manager can then fund each team member from the respective budget. The team manager may also be given the opportunity to allocate coupons to team members. The team members may then use their coupons or funds to purchase access to compute resources over different cloud and local compute providers. According to some examples, a manager may be allowed to use a team budget to fund a different team budget, or members not associated with the team budget.

The team manager, or other user, may also be allowed to restrict access to certain providers if the team manager deems the particular providers too expensive, unreliable, or for some other reason. Take, for example, a team that generally has access to their local cluster and other third-party clusters. Due to market forces, their own cluster or another cluster may be the most cost-effective provider for a given time period. As such, so that a team member does not inadvertently employ a more expensive provider, the team manager may prevent member access to one or more of the more expensive providers. Whether to employ this restriction feature may be left to the team manager's discretion. Alternatively, a smart contract or the like could be employed to automatically restrict provider access based on costs, geographic location, provider performance, or any other reason baked into the smart contract.

As such, the techniques and system described herein provide granular and real-time control of budgets employed in team distributed computing environments. Administrators or super users may control privileges of other users. Alternatively, or in addition, smart contract features can be implemented to automatically determine privileges of one or more users.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Further, the use of terms like first, second, and third do not infer order unless stated otherwise. Rather, such terms general serve as differentiators.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g.," in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method comprising:
   creating, via a graphical user interface (GUI), a distributed computing team;
   linking, via a management server, a digital team wallet to the distributed computing team, wherein the digital team wallet is linked to a currency account;
   adding, via the management server, a plurality of team members to the distributed computing team;
   identifying, via the management server, a first team member of the plurality of team members as having a geographic restriction associated therewith, wherein identifying the first team member is based on an Internet Protocol (IP) address;
   creating, via the management server, a first geographic spending boundary for the first team member having the geographic restriction associated therewith, wherein the geographic restriction indicates that the first team member is restricted from purchasing cloud computing resources that reside in at least one restricted geographic region;
   providing, via the management server, a first list of selectable cloud computing resources for purchase to the first team member's GUI, wherein the first list is based on the first geographic spending boundary such that the first team member is unable to use the digital team wallet to purchase the cloud computing resources that reside in the at least one restricted geographic region; and
   notifying, via the GUI, a team manager when funds in the digital team wallet reduce to at least a team threshold value.

2. The method of claim 1 further comprising adding funds to the digital team wallet when funds in the digital team wallet are at least one of below the team threshold value and at the team threshold value, wherein the team manager at least creates the distributed computing team, adds the first team member to the distributed computing team, and adds the funds to the digital team wallet.

3. The method of claim 1 further comprising creating, via the management server, additional geographic spending boundaries for any remaining team members having geographic restrictions associated therewith, wherein the any remaining team members includes team members other than the first team member.

4. The method of claim 3 further comprising:
   identifying, via the management server, the any remaining team members having geographic restrictions associated therewith, wherein identification is based in part on locations of each of the any remaining team members.

5. The method of claim 1 further comprising:
   creating, via the graphical user interface (GUI), an additional distributed computing team, wherein the team manager creates the additional distributed computing team; and
   linking an additional digital team wallet to the additional distributed computing team;
   adding members to the additional distributed computing team, wherein the team manager adds the members to the additional distributed computing team.

6. A management server configured to execute instructions that cause the management server to:
   create a distributed computing team;
   link a digital team wallet to the distributed computing team, wherein the digital team wallet is linked to a first currency account;
   add a member to the distributed computing team;
   identify a member geographic location of the member;
   determine that the member geographic location is located in a geographic region associated with a geographic restriction, wherein the geographic restriction indicates that purchases of cloud computing resources located in at least one restricted geographic region is prohibited, and wherein the determination that the member geographic location is located in the geographic region associated with the geographic restriction is based on an internet protocol (IP) address of the member;

create at least one geographic spending boundary associated with the member, wherein the at least one geographic spending boundary omits the at least one restricted geographic region;

prohibit fund withdrawal from the digital team wallet by the member to purchase access to any cloud compute resource that is located outside the geographic spending boundary; and set a team threshold value, wherein a team manager is notified when funds in the digital team wallet reduce to at least the team threshold value.

7. The management server of claim 6, the instructions further cause the management server to add funds to the digital team wallet when funds in the digital team wallet are at least one of below the team threshold value and at the team threshold value, wherein the team manager at least creates the distributed computing team, adds the member to the distributed computing team, and adds the funds to the digital team wallet.

8. The management server of claim 7, the instructions further cause the management server to:
notify the team manager when funds in the digital team wallet reduce to the team threshold value.

9. The management server of claim 6, the instructions further cause the management server to:
add additional team members to the distributed computing team, wherein the team manager adds the additional team members to the distributed computing team.

10. The management server of claim 9, the instructions further cause the management server to:
identify at least one geographic location that at least one of the additional team members is restricted from purchasing access to compute resources from, wherein identification of the at least one geographic location is based on each geographic location of each of the additional members; and
prohibit, based on the identification, at least one of the additional members from purchasing access to computer resources located in the at least one identified geographic location.

11. The management server of claim 6, the instructions further cause the management server to:
create an additional distributed computing team, wherein the team manager creates the additional distributed computing team; and
link an additional digital team wallet to the additional computing team.

12. A method comprising:
creating, via a management server, a distributed computing team;
linking a digital team wallet to the distributed computing team, wherein the digital team wallet is linked to a currency account;
adding, via the management server, at least a first member and a second member to the distributed computing team;
creating, via the management server, a list of a plurality of cloud compute providers;
identifying, via the management server, a location of each cloud compute provider of the plurality of cloud compute providers;
enabling, via the management server, the first member to purchase compute resource access, using the digital team wallet, from any of the cloud compute providers of the plurality of cloud compute providers;
identifying, via the management server, a second member location;
prohibiting, via the management server, the second member from purchasing compute access, using the digital wallet, from at least one cloud computer provider of the plurality of cloud providers, wherein prohibiting the second member from purchasing the compute access is based on the second member location and the location of the at least one cloud compute provider; and
notifying a team manager when funds in the digital team wallet reduces to at least a team threshold value.

13. The method of claim 12 further comprising adding funds to the digital team wallet when funds in the digital team wallet fall to one of the team threshold value and below the team threshold value.

14. The method of claim 13, further comprising determining, via the management server, that the second member location has a geographic restriction associated therewith that limits geographic regions from which cloud compute access can be purchased.

15. The method of claim 12 further comprising:
linking a digital member wallet to the first member; and
allowing the first member to purchase compute resource access using the digital member wallet.

16. The method of claim 13 further comprising:
creating additional distributed computing teams; and
adding members to each of the additional distributed computing teams.

* * * * *